United States Patent [19]

Kostamo

[11] Patent Number: 4,804,055
[45] Date of Patent: Feb. 14, 1989

[54] TRACTOR ATTACHMENT

[75] Inventor: Pentti Kostamo, Jyväskylä, Finland

[73] Assignee: Valmet Oy, Helsinki, Finland

[21] Appl. No.: 98,217

[22] Filed: Sep. 18, 1987

[51] Int. Cl.⁴ .................... B60K 17/28; B60K 25/00
[52] U.S. Cl. .................................. 180/53.3; 180/53.4; 180/900
[58] Field of Search ............... 180/69.6, 53.3, 53.4, 180/900, 299, 242

[56] References Cited

U.S. PATENT DOCUMENTS 4,021,105  1/1978  Von Allnorden .............. 180/53.3
4,580,650  4/1986  Matsuda ....................... 180/89.1

FOREIGN PATENT DOCUMENTS 2820053  11/1978  Fed. Rep. of Germany ..... 180/53.4

Primary Examiner—Kenneth R. Rice
Attorney, Agent, or Firm—Armstrong, Nikaido, Marmelstein & Kubovcik

[57] ABSTRACT

An attachment for a tractor comprises a frame which is demountable from the tractor, a hydraulic motor having a power take off shaft mounted on the frame, a pivotal attachment mounting for an upper link of a three point hitch, lifting arms pivotally mounted on the frame for raising and lowering the lower links of the three point hitch by means of swinging link arms connected between the lower links and the lifting arms, hydraulic rams mounted on the frame for raising and lowering the lifting arms, and respective releasable hydraulic couplings connected to the hydrulic motor and to the rams for connection to a hydraulic system of the tractor.

9 Claims, 2 Drawing Sheets

TRACTOR ATTACHMENT

This invention relates to an attachment for a tractor.

Tractors find wide application in agriculture for towing or carrying a wide variety of implements, such as ploughs, harrows, sowing machines, muck spreaders, and balers. For these purposes an agricultural tractor usually has a rear three point hitch and a power take off shaft built in as an integral part of the design of the tractor.

For uses other than in agriculture a rear three point hitch or a power take off shaft may not be necessary and their presence on the tractor may be a hindrance to efficient mounting and operation of other implements such as a rear mounted loader.

For these reasons manufacturers wishing to offer tractors for both types of usage have typically marketed two different designs, one with an integral three point linkage and power take off drive and one without such items.

The present invention seeks to obviate the need for manufacturers to market two different designs of tractor.

If further seeks to provide a design of tractor which can be modified readily at a late stage in manufacture to suit agricultural usage, on the one hand, and other on- or off-road duties, on the other hand. It also seeks to provide a design of tractor which can be adapted at will by the user for use either as a conventional agricultural tractor with a rear three point hitch and power take off shaft or as a tractor without such items.

Yet another aim of the invention is to provide a design of tractor wherein servicing and repair of the rear three point hitch and power take off shaft is facilitated.

According to the present invention there is provided an attachment for a tractor comprising a frame which is demountable from the tractor, a hydraulic motor having a power take off shaft mounted on the frame, a pivotal attachment mounting for an upper link of a three point hitch, lifting arms pivotally mounted on the frame for raising and lowering the lower links of the three point hitch by means of swinging link arms connected between the lower links and the lifting arms, hydraulic rams mounted on the frame for raising and lowering the lifting arms, and respective releasable hydraulic couplings connected to the hydraulic motor and to the rams for connection to a hydraulic system of the tractor.

In a preferred embodiment the attachment further includes a rear hitch which is linked to the lifting arms.

The invention further provides a tractor having mounted at its rear end an attachment which comprises a frame which is demountable from the tractor, a pair of lower links of a three point hitch pivotally mounted on the tractor, one to each side of the frame, a hydraulic motor having a power take off shaft mounted on the frame, a pivotal attachment mounting on the frame for an upper link of the three point hitch, lifting arms pivotally mounted on the frame for raising and lowering the lower links of the three point hitch by means of swinging link arms connected between the lower links and the lifting arms, hydraulic rams mounted on the frame for raising and lowering the lifting arms, and respective releasable hydraulic couplings on the frame connected to the hyrdaulic motor and to the rams for connection to a hydraulic system of the tractor.

In order that the invention may be clearly understood and readily carried into effect a preferred embodiment thereof will now be described, by way of example only, with reference to the accompanying drawings, wherein.

Figure 1:
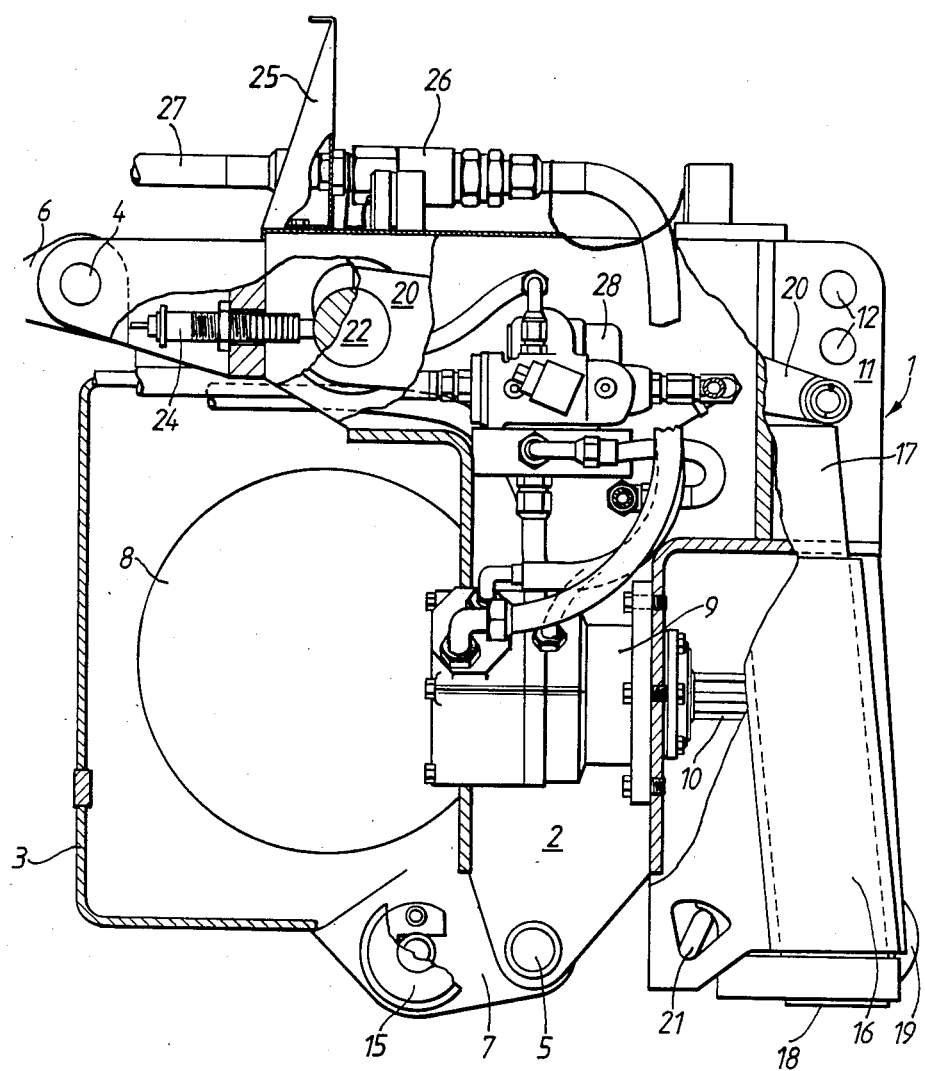
FIG. 1 is a side view, partly in section, of a demountable attachment mounted on a tractor.
Figure 2:
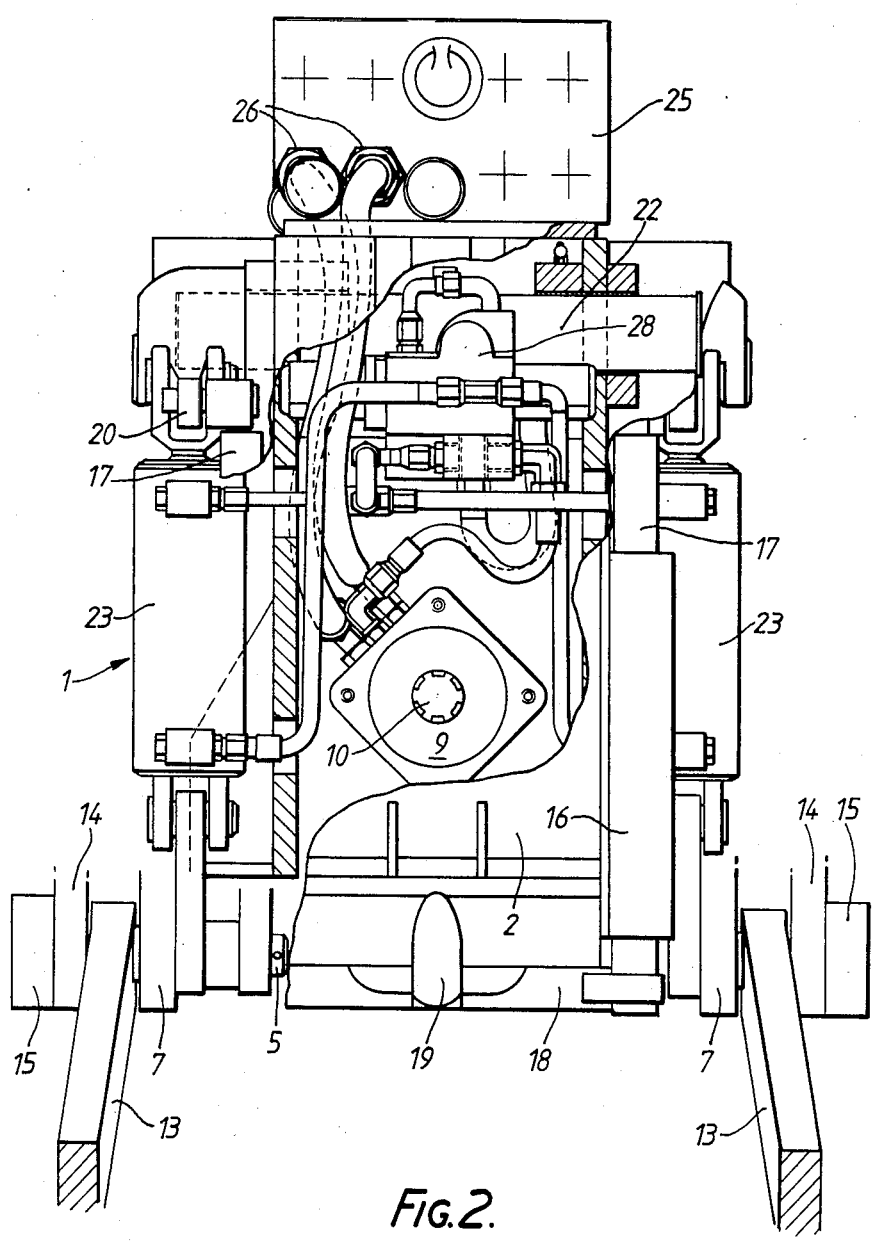
FIG. 2 is a rear view, also partly in section, of the attachment of FIG. 1.

Referring to the drawings, a demountable attachment 1 for a tractor comprises a frame, indicated generally at 2, mounted on the rear chassis 3 of an articulated tractor having individual hydraulic wheel motors driven by a pair of pumps coupled to a diesel engine. As the tractor is driven hydraulically it has no rear differential which facilitates mounting of the attachment 1. Frame 2 is secured to the rear chassis of the tractor by bolts 4, 5 passing through corresponding holes in frame 2 and secured in respective lugs 6, 7 on the rear chassis 3. The position of the hydraulic motor for one of the rear wheels is indicated at 8 in FIG. 1.

Frame 2 carries a hydraulic motor 9 having a rearwardly projecting power take off shaft 10. If further includes a pair of side-by-side flanges 11 each provided with four vertically spaced holes 12 (only two of which are visible in FIG. 1) for pivotal attachment of the upper link (not shown) of a three point hitch. Flanges 11 are positioned so that holes 12 in one flange 11 are aligned with those in the other flange 11.

The lower links 13 of the three point hitch are pivotally mounted on lugs 14 on the rear chassis 3 of the tractor. Reference numerals 15 indicate load sensors for lower links 13.

Hollow box members 16 are attached, one at each side of the rear of frame 2, for reception of the uprights 17 of a U-shaped member which is completed by a transverse yoke 18 on which is mounted a rear hitch 19. This U-shaped member can be raised and lowered by means of lifting arms 20, to whose free ends uprights 17 are pivotally connected. A retainer 21 is provided to enable the U-shaped member to be held in its upper position; retainer 21 can be pivoted forward to allow rear hitch 19 to be lowered. Lifting arms 20 are mounted on a cross-shaft 22 and can be raised and lowered by means of rams 23. Besides being used for raising and lowering rear hitch 19, lifting arms 20 also serve for raising and lowering links 13 of the three point hitch, being connected thereto by means of conventional swinging link arms (not shown) so as to complete a trapezoidal linkage. Load sensors 24 are provided for sensing the load on cross-shaft 22 and are arranged to assist in control, together with load sensors 15, of an automatic draft control system.

An upright flange 25 on top of frame 2 provides a mounting for a plurality of releasable couplings 26 by means of which hydraulic lines 27 connected to a hydraulic system of the tractor, which is separate from the hydraulic circuit used for operation of the wheel motors 8, can be releasably coupled for operating the hydraulic motor 9 and rams 23. Reference numeral 28 indicates a linkage control block which forms part of the automatic draft control system.

The frame 2 is secured to the tractor by means of four bolts 4, 5. In the event of repair being necessary to the attachment 1 it is a simple matter to release hydraulic lines 27 from couplings 26, to undo bolts 4, 5 and to remove or disconnect the swinging link arms (not shown) linking arms 20 and lower links 13. The attachment 1 can then be removed and replaced, if desired, by a fresh unit, thereby greatly facilitating servicing of the tractor.

If the tractor is to be used for non-agricultural uses or if, for any reason, the presence of a three point hitch is not required or is undesirable because its presence interferes with another attachment 1, then it is a simple matter to remove the attachment, either temporarily or permanently. After removal of attachment 1, lower link arms 13 can readily be removed to complete removal of the rear three point hitch.

By adoption of the invention a manufacturer of tractors can, by affixing attachment 1 or omitting it, produce at will, at a late stage in manufacture, a tractor that is suitable for agricultural use, on the one hand, (i.e. with a rear three point hitch and power take off shaft) or for other on- or off-road duties, on the other hand (i.e. without a rear three point hitch without a and power take off shaft). Hence in suitable cases the invention considerably increases the versatility of a tractor design.

What is claimed is:

1. An attachment for mounting at a rear end of a tractor to provide a rear power take off shaft for the tractor, which attachment comprises a frame which is demountable from the tractor, a hydraulic motor having a power take off shaft mounted on the frame, a pivotal attachment mounted for an upper link of a three point hitch, lifting arms pivotally mounted on the frame for raising and lowering the lower links of the three point hitch by means of swinging link arms connected between the lower links and the lifting arms, hydraulic rams mounted on the frame for raising and lowering the lifting arms, and respective releasable hydraulic couplings connected to the hydraulic motor and to the rams for connection to a hydraulic system of the tractor.

2. An attachment according to claim 1, in which a rear hitch is linked to the lifting arms.

3. An attachment according to claim 1, in which the pivotal mounting provides a plurality of different attachment points for the upper link of the three point hitch.

4. An attachment according to claim 1, which further comprises elements of an automatic draft control system.

5. A tractor having mounted at its rear end an attachment providing a rear power take off shaft for the tractor, which attachment comprises a frame which is demountable from the tractor, a pair of lower links of a three point hitch pivotally mounted on the tractor one to each side of the frame, a hydraulic motor having a power take off shaft mounted on the frame, a pivotal attachment mounting for an upper link of the three point hitch, lifting arms pivotally mounted on the frame for raising and lowering the lower links of the three point hitch by means of swinging link arms connected between the lower links and the lifting arms, hydraulic rams mounted on the frame for raising and lowering the lifting arms, and respective releasable hydraulic couplings on the frame connected to the hydraulic motor and to the rams for connection to a hydraulic system of the tractor.

6. A tractor according to claim 5, which further comprises a rear hitch linked to the lifting arms.

7. A tractor according to claim 5, in which the pivotal mounting provides a plurality of different attachment points for the upper link of the three point hitch.

8. A tractor according to claim 1, which further comprises elements of an automatic draft control system.

9. A tractor having a pair of front ground-contacting wheels, a pair of rear ground rear-contacting wheels, a hydraulic wheel motor for driving each ground-contacting wheel, said hydraulic wheel motors being driven by a pair of pumps coupled to a diesel engine on the tractor, and having mounted at its rear end an attachment providing a rear take off shaft for the tractor, which attachment comprises a frame which is demountable from the tractor, a pair of lower links of a three point hitch pivotally mounted on the tractor one to each side of the frame, a hydraulic motor having a power take off shaft mounted on the frame, a pivotal attachment mounting on the frame for an upper link of the three point hitch, lifting arms pivotally mounted on the frame for raising and lowering the lower links of the three point hitch by means of swinging link arms connected between the lower links and the lifting arms, hydraulic rams mounted on the frame for raising and lowering the lifting arms, and respective releasable hydraulic couplings on the frame connected to the hydraulic motor and to the rams for connection to a hydraulic system of the tractor.

* * * * *